July 2, 1957  S. C. EASTWOOD  2,798,029
PROCESS FOR HYDROCARBON CONVERSION
Filed Oct. 7, 1952  2 Sheets-Sheet 2
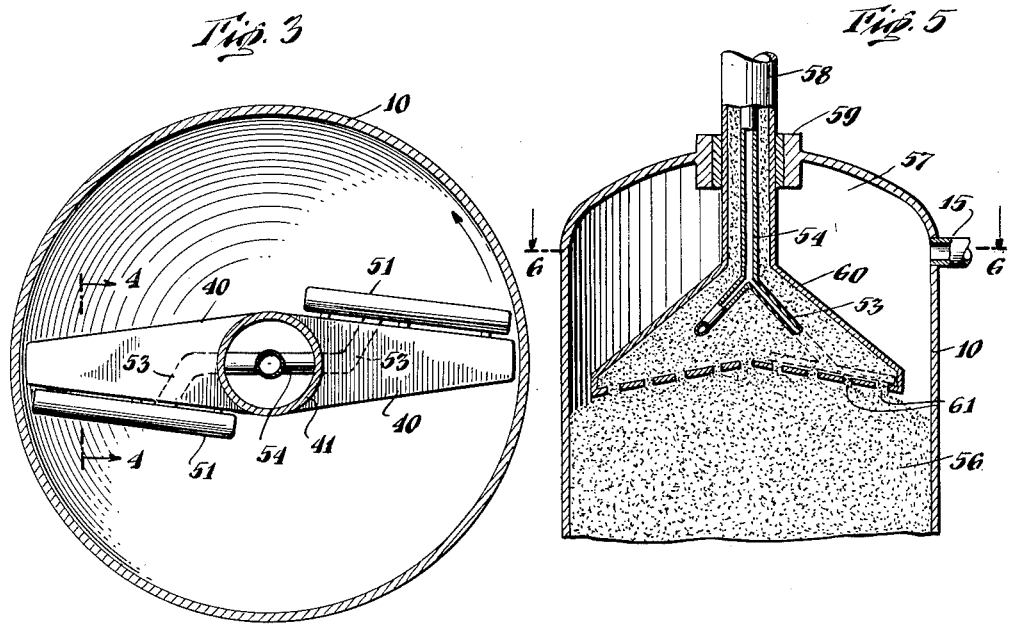
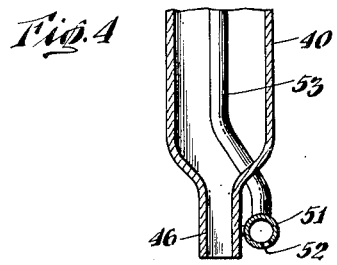
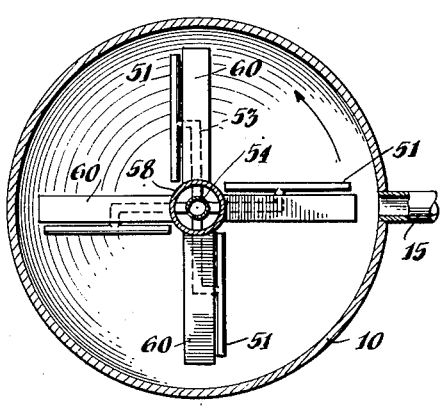
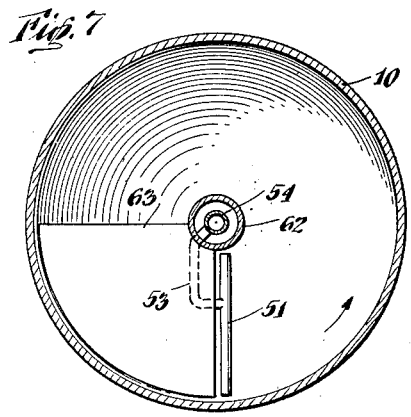
INVENTOR.
Sylvander C. Eastwood
BY
Andrew L. Jaboriault
AGENT

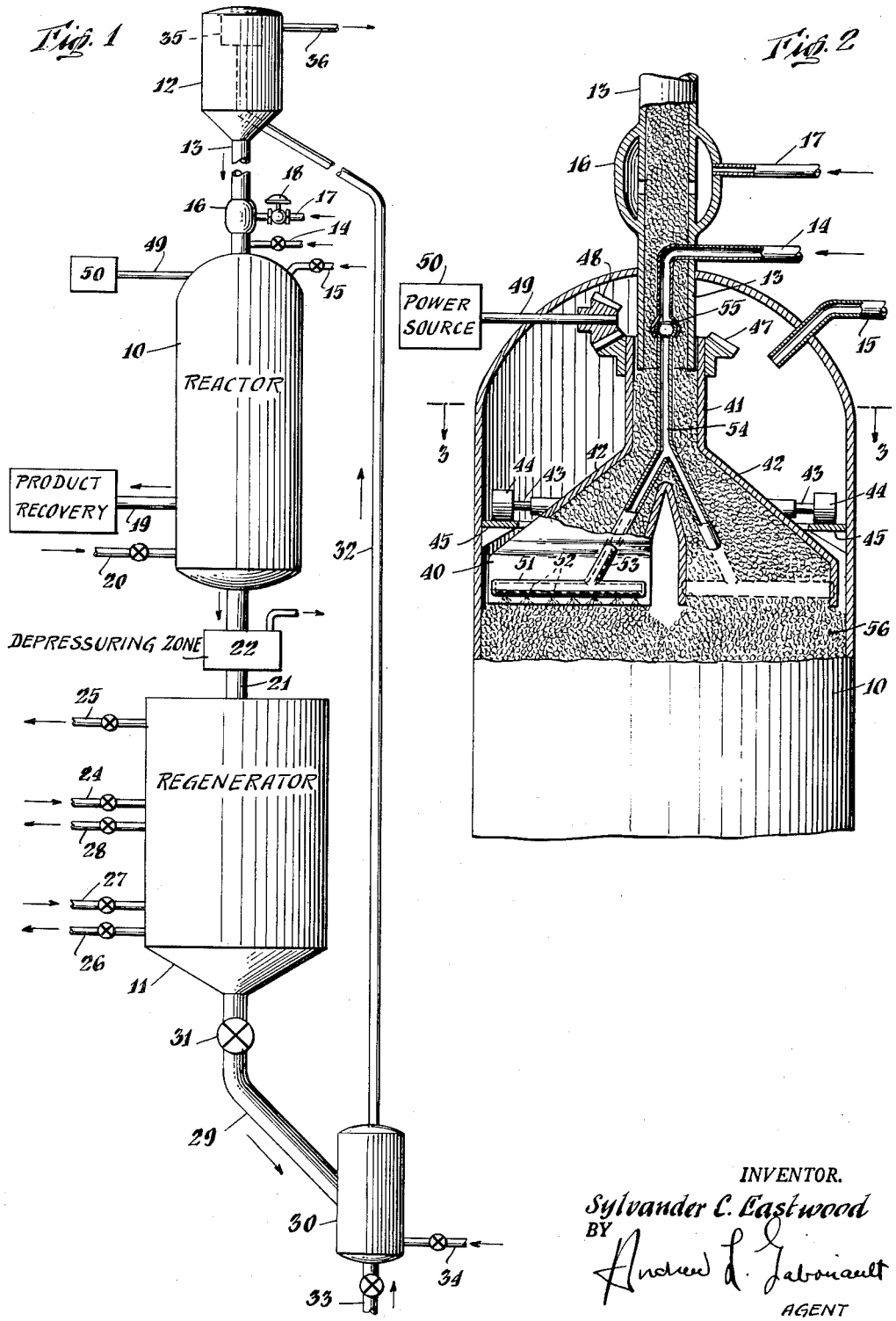

United States Patent Office 2,798,029
Patented July 2, 1957

2,798,029
PROCESS FOR HYDROCARBON CONVERSION

Sylvander C. Eastwood, Woodbury, N. J., assignor to Socony Mobil Oil Company, Inc., a corporation of New York Application October 7, 1952, Serial No. 313,545

13 Claims. (Cl. 196—52)

This invention relates to the conversion of fluid reactants in the presence of a downwardly moving bed of granular contact material. It is more particularly concerned with a method and apparatus for the introduction of contact material and fluid reactants to such a bed in a manner suitable to achieve uniform distribution of contact material and reactants across the horizontal cross-section of the bed so that there is uniform conversion of the reactants.

The present invention is applicable to many conversion systems, particularly hydrocarbon conversion processes. Typical of the process to which it applies is the catalytic conversion of high boiling hydrocarbon reactants wherein a granular adsorbent catalytic contact material is passed cyclically through successive zones or vessels in the first of which it is contacted with the reactants to effect the conversion thereof to lower boiling gaseous products, and in the second of which carbonaceous contaminants deposited on the catalyst by the conversion reaction are burned off by means of a fluid regeneration medium such as a combustion supporting gas so that the catalyst will be in a suitable condition for reuse in the conversion zone. Other examples of suitable processes include reforming, hydrogenation, dehydrogenation, aromatization, alkylation, and thermal visbreaking, coking or cracking and processes which comprise a combination of two or more such processes. Thermal, non-catalytic operations are usually carried out at elevated temperatures, in the presence of non-catalytic heat-exchanging bodies, such as spheres or particles of metals, stones, or refractory materials, e. g., mullite, zirkite, coke, or corhart materials. On the other hand, catalytic cracking is effected, at temperatures in the order of about 800° F. and higher, in the presence of suitable absorbent-type catalysts. Suitable catalysts include natural or treated clays; bauxite; inert carriers on which catalytic materials, such as metal oxides, have been deposited; or certain synthetic associations of silica and/or alumina, to which small amounts of other materials, such as metal oxides, can be added for special purposes. When the operation involves other catalytic operations, such as reforming, aromatization, hydrogenation, etc., catalysts typically amenable to such processes are used. Such catalysts are well known to those familiar with the art. Accordingly, reference should be made to the voluminous literature concerning such processes, in order to determine the specific catalysts and operating conditions which are feasible for any given process or set of processes.

The contact material used should be of palpable particulate form as distinguished from finely divided powders and the term "granular" so used herein in describing and claiming this invention should be understood to include any contact material of this form. The contact material may take the shape of pellets, tablets, spheres, capsules or particles of irregular shape such as are obtained from grinding and screening operations. Generally, the contact material granules should be within the range about 3 to 100 mesh and preferably within the range about 4 to 20 mesh by Tyler standard screen analysis.

Terms such as "contact material," "contact mass," and "contact mass material" refer to contact materials broadly herein, whether they are catalytic or non-catalytic with respect to the process involved, unless specifically stated otherwise. Likewise, the term, "conversion," is applied to catalytic or non-catalytic operations in which the aforementioned contact materials are utilized to change the physical and chemical characteristics of charge stocks. The term "gaseous phase," and similar terms, refer to material which is in the gaseous state under the particular conditions of the operation involved, regardless of the normal phase under ordinary conditions of temperature and pressure.

The introduction of granular contact material and fluid reactants to a bed of the contact material in a conversion zone presents numerous problems. If the contact material is supplied to the upper surface of the bed as a central stream the contact material will tend to segregate in the bed according to particle size. The larger particles will tend to accumulate toward the outer edges of the bed while the smaller particles tend to accumulate toward the center of the bed. Thus, any gaseous material flowing through the bed, whether it be a vaporized charge or gaseous products will tend to channel through the bed, the major portion of the flow occurring in regions where the large particles of contact material are concentrated. This results in an uneven conversion of the charge and an inferior product. In addition, where the contact material supplies at least a major portion of the heat required for the conversion reaction and at least part of the charge is introduced as a vapor above the contact material bed at a temperature substantially below the contact material temperature, a large temperature gradient across the horizontal cross-section of the bed occurs, with a maximum directly below the contact material supply stream and a minimum toward the outer edges of the bed. This is brought about by heat exchange between the cooler vaporized charge and hot contact material particles which roll over the surface of the bed toward the outer edges of the conversion zone. The amount of cooling of any given particle is dependent on the point at which it enters the bed from the surface. Thus, the vaporized charge which enters the outer regions of the bed will encounter cooler contact material than that which enters the central regions of the bed. This again brings about non-uniform conversion. It might be thought that such uneven temperature conditions might be equalized by interchange of vapor or contact material between central and outer regions as they pass through the bed, but it has been found that such interchange is not sufficient to equalize the temperature across the bed even in its lower portions. While the above-described effect is most pronounced where there is only a single supply stream of contact material, it occurs also where there are a plurality of widely spaced apart supply streams and, in fact, to any method of supply where contact material rolls over the bed surface and vaporized charge is supplied above the bed surface.

A like problem occurs where a part or all of the reactants are supplied to the upper surface of the bed as a liquid at a substantially lower temperature than the contact material. The contact material particles, which roll over the bed surface continually, are in contact with cooler liquid charge during such passage. An additional problem occurs, when liquid reactants are used, in effecting uniform distribution of the liquid over the horizontal cross-section of the bed without the formation of coky deposits on the hot metal parts in the upper section of the conversion zone above the bed. These deposits tend to accumulate and break off in large pieces which plug up the restricted passages in the lower section of the conversion zone and elsewhere in the system.

A major object of this invention is to provide a method and apparatus for the conversion of fluid reactants which overcome the above-described difficulties.

Another object of this invention is to provide a method and apparatus for the conversion of a liquid hydrocarbon charge which provides for uniform distribution of the liquid charge across a downwardly moving bed of contact material without the formation of excessive amounts of coke deposits on hot metal parts in the reaction zone.

Another object of this invention is to provide, in a system for the conversion of vaporized hydrocarbon charge in the presence of a substantially compact bed of granular contact material wherein a major portion of the heat required is supplied by the fresh contact material, a method and apparatus for introducing vaporized charge and contact material which maintains a substantially constant temperature across the bed at any given level therein.

Another object of this invention is to provide a method and apparatus for the conversion of a liquid hydrocarbon charge and a vaporized hydrocarbon charge in the presence of a moving contact material mass simultaneously and uniformly in the same reaction without an excessive temperature gradient across the mass at any given level.

These and other objects of the invention will be apparent from the following description.

In general, this invention provides a conversion system wherein the granular contact material is supplied to a downwardly gravitating, substantially compact bed of contact material as a substantially compact stream which is initially substantially vertical but expands outwardly on its lower end so that it extends at least substantially half way across the upper surface of the bed in one direction to a point adjacent the outer edge of said surface while in another direction the stream extends less than completely across the bed. The expanded portion is continuously rotated and contact material discharged uniformly therefrom on to the upper surface of the bed. The fluid reactants or charge is supplied to the upper surface of the bed. Where a part or all of the charge is supplied as a liquid, the liquid is applied evenly to the upper surface of the bed in front of the rotating stream of contact material to produce a film of liquid on said surface. The film is continuously covered by a layer of fresh contact material from said stream. When a part or all of the charge is supplied as a vapor the charge is introduced at a temperature substantially below the fresh contact material temperature and is supplied to a gas space above the bed from which it passes into the upper end of the bed. The expanded portion of the supply stream is confined on top and sides at angles greater than the angle of repose of the contact material thereby preventing free flow of contact material across a contact material surface with resultant segregation of the contact material according to particle size. By this means liquid charge is distributed uniformly over the bed surface without contacting hot metal in the upper part of the reactor and the temperature across the contact material bed at any level is substantially constant since there are no contact material particles rolling over the bed surface.

This invention will be best understood by referring to the attached drawings of which, Figure 1 is an elevational view showing the general arrangement of a continuous hydrocarbon conversion system of a type to which this invention may be applied, Figure 2 is an elevational view of the upper portion of the conversion vessel showing the application of this invention thereto, Figure 3 is a sectional view along line 3—3 of Figure 2, Figure 4 is a sectional view along line 4—4 of Figure 3, Figure 5 is an elevational view, partially in section, of the upper section of a conversion chamber using a modified form of this invention, Figure 6 is a sectional view along line 6—6 of Figure 5 and, Figure 7 is a plan view illustrating a further modification of this invention.

All of these drawings are highly diagrammatic in form and like parts in all bear like numerals.

Referring now to Figure 1, there are shown, a reaction or conversion vessel 10, a regeneration or revivification vessel 11, and a system for transferring contact material from the regeneration vessel to the reactor. In operation, granular contact material is supplied from hopper 12 via feed leg 13, as a substantially compact column, to the reactor 10. The reactor 10 is partially filled with a substantially compact, downwardly-moving bed or column of contact material. Liquid hydrocarbon charge stocks to be converted are introduced into the reactor via pipe 14. If vaporized hydrocarbon charge stocks are also used, they are supplied via pipe 15. Or vaporized charge may be used alone if desired. In order to prevent the escape of vapors from the reaction vessel, a seal zone 16 is provided on feed leg 13. A seal therein is effected by the introduction of inert seal gases via pipe 17, the flow of which is regulated by a diaphragm valve 18 controlled by a differential pressure control system (not shown). Gaseous conversion products are withdrawn via pipe 19 to a product recovery operation. An inert purge gas is supplied through pipe 20 at a level below the gaseous product outlet 19 for the purpose of purging gaseous reaction products from the outflowing used contact material. The used contact material is withdrawn as a substantially compact column via conduit 21 through a depressuring zone 22 into the reconditioner 11. In processes such as catalytic cracking of hydrocarbons, there usually is a considerable lay-down of coke deposits on the contact material. In such a case, the reconditioner 11 takes the form of a regenerator, wherein oxygen or air is introduced via pipe 24 to burn off the coke deposits. The combustion gases are removed through pipes 25 and 26. Cooling may be effected, if necessary, by means of a suitable heat transfer medium circulating through coils (not shown) in the regenerator, which enters via pipe 27 and exits via pipe 28. In other processes wherein coking will not be encountered, the reconditioner can take the form of a heater, heating being accomplished by means of heating gases introduced via pipe 24 and exiting via pipes 25 and 26. The regenerated or reheated contact material gravitates in a substantially compact column through conduit 29 into a lift feed tank 30.

The rate of contact material withdrawal from the revivification vessel 11 is controlled by a valve 31 on a conduit 29. In the embodiment shown in Figure 1, the entire contact material flow from the hopper 12 through to the lift feed tank is gravitational, and it embodies a substantially continuous column of contact material. Accordingly, it will be appreciated that by means of regulating the valve 31, the rate of contact material flow in the entire system just described is controlled.

Fresh contact material is transferred from the lift feed tank 30 to the hopper 12 via a lift conduit 32. In the embodiment shown, lift gases are introduced via pipes 33 and 34 to carry the contact material, in gaseous suspension, up the lift conduit 32. Separation of the contact material from the lift gas is effected in the separation zone 35 located within the hopper 12. The separated lift gas is exhausted through pipe 36.

The method and apparatus for effecting distribution of liquid charge stock throughout the contact material bed, in accordance with the present invention, are illustrated in Figures 2, 3 and 4, which will be discussed together. Shown therein are supply conduit 13 extending centrally and vertically into the upper end of cylindrical conversion chamber 10. A second conduit 40 is rotatably mounted on the lower end of conduit 13 and consists of a central vertical portion 41 which then expands outwardly so as to extend substantially completely across chamber 10 on its lower end in one lateral dimension while there is no expansion in the dimension at right angles to the first-named dimension. This, in effect forms two arms or legs 42 for the distribution of contact material, each extending substantially halfway across chamber 10 to points adjacent a wall thereof. The bottoms of legs 42 have longitudinal openings 46 extending substantially their complete length. Conduit 40 is supported by means of a plurality of shafts 43 rigidly affixed to 40 at one end and terminating at the other in wheels or rollers 44 adapted to run on a circular track or ledge 45 mounted along the inside wall of vessel 10. The sides and top of the expanded portion of 40 make angles with the horizontal greater than the normal angle of repose of the contact material thereby preventing any free flow of contact material in this expanded portion across a contact material surface. The angle of repose will vary depending on the particular contact material from about 25 to 45 degrees. Generally it is about 30 degrees. A suitable mechanism for rotating conduit 40 in a substantially horizontal plane is supplied, consisting, in Figure 1, of a bevel ring gear 47 rigidly attached about central section 41 driven by a power source 50 through shaft 49 and bevel pinion gear 48. The power source may be any suitable motor or engine with a suitable reduction gear system and means for speed control. A liquid charge manifold or spray device 51 is mounted on each of the leading edges of arms 42 and extends substantially the length of 42. Manifolds 51 have a plurality of spaced apart orifices 52 therein on their under sides and are connected to a liquid charge inlet conduit 14 through a main feed pipe 54 with branches 53. Pipe 54 is rotatably attached to conduit 14 through a universal or ball and socket joint 55. Vaporzied charge supply conduit 15 extends into chamber 10 at a level above the lower end of conduit 40.

In operation, a downwardly gravitating, substantially compact column of granular contact material 56 is maintained within the lower section of conversion zone 10 with a gas space 57 thereabove in the upper section of zone 10. Contact material, at a temperature suitable to supply a major portion of the heat required for the conversion reaction, gravitates as a substantially compact stream which is initially vertical and then expands so that is extends substantially completely across the upper surface of bed 56 along a single line or diameter of 57, through conduits 46 and 40. The expanded portion of the stream is confined at angles greater than the angle of repose thereby preventing segregation of the contact material according to particle size as previously discussed. The expanded portion of the stream is continuously rotated in a substantially horizontal plane and discharged from the lower end of 40 onto the surface of column 56 and is distributed thereby uniformly across the surface so that there is no transverse flow of contact material over the surface. Liquid hydrocarbon charge is sprayed onto the surface of 56 from manifolds 51 ahead of the rotating contact material stream and forms a film of liquid thereon which is continuously covered by a layer of fresh contact material from passageway 40. This layer is formed because of the downward movement of column 56 which tends to fall away from conduit 40. Vaporized hydrocarbon charge enters gas space 57 through passage 15 at a temperature substantially below the fresh contact material temperature and distributes itself through space 57 before passing into the upper end of column 56 between rotating legs 42. Liquid and vaporized charge pass through column 56 and are converted as previously described.

Figures 5 and 6 illustrate a modification of this invention in which a central vertical conduit 58 is rotatably mounted in the upper end of cylindrical conversion chamber 10 by a bearing 59. Conduit 58 extends into chamber 10 and a plurality of uniformly spaced apart passageways 60 extend outwardly from conduit 58 and the central portion of vessel 10 to points adjacent to the walls of 10. The tops and sides of passageways 60 are at angles greater than 30 degrees while the bottoms are at angles less than 30 degrees. A plurality of uniformly spaced apart orifices or slots 61 penetrate the bottom of each of passageways 60 so as to define a plurality of passageways therein. Means (not shown) for continuously rotating conduit 58 and passageways 60 are provided exterior to chamber 10. A liquid feed system similar to that shown in Figure 2 is provided with one of manifolds 51 being mounted on the leading edge of each of passageways 60.

The modification shown in Figures 5 and 6 operates in a manner similar to Figure 1 with fresh contact material gravitating as a central compact stream through passage 58 and then outwardly as a plurality of streams through passages 60 and finally as a plurality of streams 61 from each of 60 onto the upper surface of column 56. Passages 60 are continuously rotated and distribute contact material uniformly over the surface of 56 and liquid charge is sprayed onto the column ahead of each of passages 60 by means of manifolds 51 so as to form a film of liquid on the surface of the column which is continuously covered by a layer of contact material. Vaporized charge passes into gas space 56 through passage 15 and then into the upper end of column 56.

Figure 7 illustrates a further modification, the central contact material conduit 62 being expanded outwardly in the shape of a quarter of a cone 63 to a point adjacent the wall of chamber 10, the quarter cone 63 making an angle with the horizontal greater than the angle of repose of the contact material, that is greater than about 30 degrees. The operation is substantially the same as those described previously with liquid charge being sprayed on the surface of the contact material column ahead of the rotating conical portion 63 from which contact material is discharged.

This invention may be advantageously operated whether the charge stock is entirely liquid, part liquid and part vapor or entirely vapor. When the charge is liquid it provides a system for uniformly distributing the liquid across the bed cross-section without danger of any substantially coking on the walls of the vessel. When vapor, it provides for a system of introducing the fresh contact material, which carries a major portion of the heat needed for the reaction, and the vaporized charge, which is substantially cooler than the hot contact material, into the conversion zone without a portion of the contact material being cooled by prolonged contact with the cooler vapor charge with a resultant temperature gradient across the contact material bed. The invention is applicable where the fluid charge is converted to lower boiling gaseous products and also to processes where the charge and product are of substantially the same boiling point, such as the reforming of vaporized charge.

As previously stated, the top and sides of the expanded, rotating stream should be confined at angles greater than the angle of repose to prevent segregation within this expanded section. Also the bottom of the expanded section should make an angle with the horizontal less than the angle of repose so that there will be substantially no transverse flow of contact material across the upper surface of column 57. The number of arms or legs like 42 may be of any given number. Adequate operation may be obtained with only one leg which extends from about the center of the upper surface of the bed to a point adjacent its outer edge. Preferably, at least two legs should be used.

Operating conditions vary widely in the process of this invention depending on the particular application. Contact material should be supplied to the conversion zone at a temperature within the range about 900° F. to 1200° F. The liquid charge stock may consist of a reduced petroleum crude, a vacuum distillate or residua decarbonized by other methods and should be heated before charging to a temperature within the range about 100° F. to 800° F. The vaporized charge may be a petroleum gas oil or a lighter petroleum fraction, such as a naphtha to be reformed, and should be preheated to a temperature within the range about 700° F. to 950° F. before it is charged. The ratio of contact material to total fluid charge should be within the range about 2 to 20 by weight. The space velocity of the total fluid charge may range from 0.2 to 10 volumes of oil per hour per volume of contact material bed.

In a typical example of the operation of this invention in a catalytic conversion system the catalyst enters at a temperature of about 1050° F. and is removed at a temperature of about 850° F. The liquid charge stock which may be a deasphalted residual petroleum stock is introduced at a temperature of about 600° F. Vaporized charge stock, which may be a petroleum gas oil, is charged at a temperature of 850° F. The catalyst to oil ratio is 5 to 1 by weight. The total fluid charge space velocity is 2.0 volumes per hour per volume of contact material bed. The charge is 60% liquid and 40% vapor by volume.

This invention should be understood to cover all changes and modifications of the examples of the invention herein chosen for purposes of disclosure which do not constitute departures from the spirit and scope of the invention.

What is claimed is:

1. A continuous process for the conversion of high boiling liquid hydrocarbons to lower boiling gaseous products in the presence of a downwardly gravitating substantially compact column of granular contact material which comprises: maintaining said column within a confined conversion zone, supplying a laterally confined substantially compact stream of contact material to said conversion zone and onto the upper surface of said bed, laterally expanding the lower section of said stream so that one lateral dimension of said stream extends at least half way across the surface of said column to a point adjacent the outer edge of said surface and the other lateral dimension of said stream at right angles to the first named lateral dimension extends less than completely across the upper surface of said column, confining the sides and top of said expanded stream at angles greater than the angle of repose of the contact material, rotating the expanded portion of the stream in a substantially horizontal plane and discharging contact material therefrom onto the upper surface of said contact material column whereby contact material discharges all around said surface without any substantial unconfined transverse flow, introducing liquid hydrocarbon charge onto the surface of said column ahead of said rotating stream, passing the liquid charge downwardly through said column to effect the desired conversion to lower boiling products, removing said products from said column and removing contact material from the lower section of said column.

2. A continuous process for the conversion of a vaporized hydrocarbon charge in the presence of a downwardly-moving bed of granular contact material, which comprises: maintaining said bed within the lower section of a confined conversion zone, maintaining a gas space above said bed in the upper section of the conversion zone, supplying vaporized hydrocarbon charge to said gas space, passing the vaporized charge into and through said bed to effect the desired conversion, passing a substantially compact stream of fresh contact material of substantially less horizontal cross-section than said bed and at a temperature suitable to supply at least a major portion of the heat required by the conversion reaction vertically into said conversion zone and onto the upper surface of said bed, laterally expanding the lower section of said stream so that one lateral dimension of said stream extends at least half way across the surface of said bed to a point adjacent the outer edge of said upper surface and the other lateral dimension of said stream at right angles to the first-named lateral dimension extends less than completely across the upper surface of said bed, confining the sides and top of said expanded stream at angles greater than the angle of repose of the contact material whereby free flow of contact material across a contact material surface is avoided, rotating the expanded portion of said stream in a substantially horizontal plane whereby contact material will be discharged uniformly across the upper surface of said bed and the temperature across said bed will be substantially constant at any given level in said bed, removing the products of the conversion from said bed and removing contact material from the lower section of said bed.

3. A continuous process for the conversion of fluid hydrocarbons in the presence of a downwardly-moving, substantially compact column of granular contact material which comprises: maintaining said column within the lower section of a confined conversion zone, maintaining a gas space above said column in the upper section of the conversion zone, passing a stream of fresh contact material into the conversion zone onto the upper surface of said column at a temperature suitable to supply at least a major portion of the heat required by the conversion reaction and said stream being initially substantially vertical and of substantially less horizontal cross-section than said bed and then expanding laterally substantially across at least half of one dimension of the upper surface of said column to a point adjacent the outer edge of said upper surface, delivering contact material to said upper surface from said expanded stream all along the dimension of said stream which extends outwardly to a point adjacent the outer edge of said upper surface confining the expanded section of said stream on top and sides at angles greater than the angle of repose of the contact material whereby there is no free flow of contact material across a contact material surface therein, rotating the expanded portion of the stream around the upper surface of said column and discharging contact material therefrom onto said surface whereby contact material is uniformly distributed across the upper surface of said bed, passing a liquid hydrocarbon charge onto the upper surface of said column ahead of said rotating stream, passing a vaporized hydrocarbon charge into said gas space at a temperature below the temperature at which contact material is supplied to the conversion zone, passing the liquid and vaporized charges downwardly through said column to effect the desired conversion, withdrawing the products of conversion from said column and withdrawing contact material from the lower section of said column.

4. A continuous process for the conversion of fluid hydrocarbons in the presence of a downwardly moving, substantially compact, cylindrical column of granular contact material, which comprises: maintaining said column within the lower section of a confined conversion zone, maintaining a gas space above said column in the upper section of the conversion zone, passing a stream of fresh contact material at a temperature suitable to supply at least a major portion of the heat required by the conversion reaction centrally into the upper section of said conversion zone and onto the upper surface of said column, said stream being initially substantially vertical and then expanding along one lateral dimension so that it extends substantially completely across one diameter of the upper surface of said column at its lower end without substantially expanding the stream in the lateral dimension at right angles to the first-named lateral dimension, confining the top and sides of the expanded portion of said stream at angles greater than the angle of repose of the contact material whereby there will be no free flow of contact material in the expanded portion across a contact material surface, maintaining the underside of said expanded stream substantially completely open to the upper surface of said column, continuously rotating the expanded portion of said stream whereby contact material will be supplied uniformly to the upper surface of said column and there will be a substantially uniform temperature across said column at any given level, spraying a liquid hydrocarbon charge onto the surface of said column uniformly across said surface in front of each half of said rotating portion of said stream whereby a film of liquid charge is continuously formed on said surface which film is continuously covered by fresh contact material from said expanded stream, supplying a vaporized hydrocarbon charge to said gas space at a temperature below the temperature of the fresh contact material, passing the vaporized hydrocarbon charge and liquid hydrocarbon charge through said column to effect the desired conversion, removing the products of conversion from the lower section of said column and removing contact material from the lower section of the column.

5. A continuous process for the conversion of vaporized hydrocarbon charge in the presence of a downwardly-moving, substantially compact, cylindrical column of granular contact material, which comprises: maintaining said column within the lower section of a confined conversion zone, maintaining a gas space in the upper section of said conversion zone above said column, supplying a vaporized hydrocarbon charge to said gas space, passing a substantially compact stream of contact material at a temperature suitable to supply a major portion of the heat required by the conversion reaction and above the temperature of the vaporized charge centrally and vertically through a confined passage into the upper end of said conversion zone, expanding said passage along a single line laterally so that it extends substantially completely across one diameter of the upper surface of said column without extending across another diameter of said surface, laterally confining the top and sides of said expanded portion of said passage at angles greater than the angle of repose of the contact material whereby there is no free flow of contact material across a contact material surface in said expanded portion, confining the bottom of said passage at an angle less than the angle of repose of the contact material, continuously rotating the expanded portion of said passage, and discharging contact material from the lower end of said passage as a plurality of uniformly spaced apart streams through a plurality of uniformly spaced apart passages in the bottom of said expanded supply passage whereby contact material is distributed uniformly across the upper surface of said column without segregation according to particle size and without any substantial variation in temperature across said column, passing the vaporized charge from said gas space into and through said column to effect the desired conversion, removing the products of conversion from said column and removing contact material from said column.

6. A continuous process for the conversion of a liquid hydrocarbon charge to lower boiling gaseous products in the presence of a downwardly-moving, substantially compact, cylindrical column of granular contact material, which comprises: maintaining said column within a confined conversion zone, passing fresh contact material into the upper end of said zone as a central compact substantially vertical stream, splitting said central stream into a plurality of substantially compact uniformly spaced apart streams which extend from said central stream to the outer edge of said conversion zone on their lower ends and terminate on the upper surface of said column, confining the tops and sides of said plurality of streams at angles greater than the angle of repose of the contact material whereby there will be no free flow of contact material across a contact material surface in said plurality of streams, maintaining the undersides of said streams substantially completely open to the upper surface of said column, continuously rotating said plurality of streams in a horizontal plane and discharging contact material from said streams uniformly along the length of the under side of said streams onto the upper surface of said column, spraying a liquid hydrocarbon charge onto the surface of said column in front of each of said plurality of streams and across the length of each of said streams whereby a plurality of films of liquid charge will be formed on the surface of said column which are continuously covered with fresh contact material, passing the liquid charge through said column to effect the desired conversion to gaseous products, removing gaseous products from the lower section of said column, and removing contact material from the lower section of said column.

7. A continuous process for the conversion of fluid hydrocarbons to gaseous products in the presence of a downwardly-moving, substantially compact, cylindrical column of granular contact material which comprises: maintaining said column within the lower section of a confined conversion zone, maintaining a gas space above said column in the upper section of said zone, passing a central substantially compact stream of fresh contact material at a temperature suitable to supply a major portion of the heat required by the conversion reaction into said conversion zone and onto the upper surface of said column, expanding the lower section of said contact material stream outwardly in the shape of a quarter of a cone to a point adjacent to the outer edge of said zone, confining said expanded portion in the shape of a quarter of a cone at an angle with the horizontal greater than the angle of repose of the contact material, delivering contact material to the upper surface of said column through substantially the entire area of the lower end of said stream, continuously rotating said expanded portion in a horizontal plane and discharging contact material therefrom uniformly onto the surface of said column whereby the temperature across said column will be substantially constant at any given level, spraying liquid hydrocarbon charge onto the upper surface of said column along a line extending across the front of said expanded portion of said stream and ahead of the rotation of said expanded portion whereby a film of liquid charge is formed on said surface continuously which is continuously covered with fresh contact material, passing a vaporized hydrocarbon charge into said gas space at a temperature below the temperature of the fresh contact material, passing liquid charge and vaporized charge downwardly through the column to effect the desired conversion to gaseous products, removing said products from the lower section of said column and removing contact material from the lower section of said column.

8. An apparatus for the continuous conversion of fluid hydrocarbons in the presence of a downwardly-moving, substantially compact bed of granular contact material, which comprises, in combination: an enclosed conversion vessel adapted to confine in said bed of contact material in its lower section, members defining a contact material supply passageway extending substantially vertically into the upper section of said chamber and expanded on its lower end so as to extend outwardly in at least one direction to a point adjacent to a wall of said chamber, the sides and top of said expanded portion making an angle with the horizontal greater than about 30 degrees, means for continuously rotating said expanded portion of said passageway whereby contact material will be supplied uniformly to the upper surface of said bed, means for supplying fluid hydrocarbon charge to the upper end of said bed, means for removing products of conversion from said bed and means for removing contact material from the lower section of said bed.

9. An apparatus for the continuous conversion of a liquid hydrocarbon charge in the presence of a downwardly moving, substantially compact column of granular contact material which comprises in combination: an enclosed conversion chamber adapted to confine said column of contact material within its lower section, a contact material supply conduit extending centrally into the upper end of said chamber, said conduit being expanded on its lower end so that one lateral dimension extends at least half way across said chamber to a point adjacent a wall of said chamber while the lateral dimension at right angles to the first named lateral dimension extends less than entirely across said chamber and the sides and top of said expanded portion making angles with the horizontal at least about 30 degrees, mechanism for rotating said expanded portion of said conduit continuously in a substantially horizontal plane, a liquid distributing means adapted to rotate in a horizontal plane in front of said expanded portion of said conduit and adapted to supply liquid to the upper surface of said bed whereby a film of liquid charge is continuously formed on said bed which is continuously covered by fresh contact material, means for removing the products of conversion from the lower section of said chamber and means for removing contact material from the lower section of said chamber.

10. An apparatus for the conversion of fluid hydrocarbon charge in the presence of a downwardly gravitating, substantially compact column of granular contact material which comprises in combination: an enclosed conversion chamber adapted to confine said column in its lower section, a contact material supply conduit extending centrally into the upper end of said chamber, said conduit being expanded on its lower end so that said lower end extends at least substantially half way across said chamber in one direction to a point adjacent to a wall of said chamber while in another direction said lower end extends less than completely across said chamber and the sides and top of said expanded section being at angles with the horizontal greater than about 30 degrees whereby there will be no free flow of contact material over a contact material surface in said expanded portion, mechanism for continuously rotating said expanded portion in a substantially horizontal plane, means for supplying vaporized hydrocarbon charge at a temperature below the fresh contact material temperature to said chamber at a level above the lower end of said conduit, a liquid charge manifold mounted on the leading edge of said expanded portion of said conduit, means for supplying a liquid hydrocarbon charge to said manifold, means for removing products of conversion from the lower section of said chamber and means for removing contact material from the lower section of said chamber.

11. An apparatus for the continuous conversion of fluid hydrocarbons in the presence of a downwardly gravitating, substantially compact column of granular contact material, which comprises in combination: an enclosed cylindrical conversion chamber adapted to confine said column in its lower section, a substantially vertical contact material supply conduit extending centrally into the upper end of said chamber and terminating in the upper section thereof, a second conduit rotatably mounted on the lower end of said central conduit and expanding outwardly along a single line so that the lower end of said second conduit terminates in the upper section of said chamber and extends substantially completely across said chamber, mechanism for continuously rotating said second conduit in a substantially horizontal plane, two downwardly directed liquid spray devices one mounted on each of the leading edges of the lower end of said second conduit and each extending the length of the leading edge on which it is mounted, means for supplying liquid charge to said spray devices, a conduit for vaporized charge extending into said chamber at a level above the lower end of said second conduit, means for removing products of conversion from the lower section of said chamber and means for removing contact material from the lower section of said chamber.

12. An apparatus for the continuous conversion of fluid hydrocarbons in the presence of a downwardly gravitating, substantially compact column of granular contact material which comprises in combination: an enclosed cylindrical conversion chamber, a contact material supply conduit extending vertically and centrally into the upper end of said chamber and terminating in the upper section thereof, said conduit being expanded on its lower end in the shape of a quarter of a cone extending outwardly to a point adjacent to the wall of said chamber, the top and sides of said expanded portion making an angle with the horizontal greater than about 30 degrees, mechanism for rotating said expanded portion in a horizontal plane, a downwardly pointing liquid spray device mounted on the leading edge of said expanded portion, means for supplying liquid hydrocarbon charge to said spray device, a vaporized hydrocarbon charge conduit extending into said chamber and terminating therein at a level above the lower end of said expanded portion of said conduit, means for removing products of conversion from the lower section of said chamber and means for removing contact material from the lower section of said chamber.

13. A continuous process for the conversion of a fluid hydrocarbon charge in the presence of a downwardly moving, substantially compact bed of granular solid contact material, which comprises: maintaining a downwardly gravitating, substantially compact bed of granular contact material within a confined conversion zone, supplying a laterally confined compact stream of contact material to the upper surface of said bed, said stream as it enters the conversion zone being of substantially less cross-section than said bed, laterally expanding the lower portion of said stream so that the horizontal cross-sectional area of the stream increases and one lateral dimension extends at least about half way across said surface to a point adjacent the outer edge of said bed, maintaining at least one lateral dimension of the lower portion of said stream less than the lateral dimensions of said bed, confining the top and sides of said expanded portion of said stream at angles with the horizontal greater than the angle of repose of the contact material, rotating the expanded portion of said stream in a substantially horizontal plane so that the contact material as it discharges from said stream will be spread uniformly over the upper surface of said bed without any substantial unconfined transverse flow, supplying a fluid hydrocarbon charge to the upper surface of said bed and passing that charge through the bed to effect the desired conversion, removing hydrocarbon products from the conversion zone and removing granular contact material from the lower section of the bed.

References Cited in the file of this patent

UNITED STATES PATENTS

| | | |
|---|---|---|
| 2,073,388 | Elliott | Mar. 9, 1937 |
| 2,159,140 | Eckell et al. | May 23, 1939 |
| 2,348,699 | Tuttle | May 9, 1944 |
| 2,565,811 | Hall | Aug. 28, 1951 |
| 2,574,489 | Lassiat et al. | Nov. 13, 1951 |
| 2,574,850 | Utterback et al. | Nov. 13, 1951 |
| 2,683,109 | Norris | July 6, 1954 |
| 2,692,702 | Church | Oct. 26, 1954 |